United States Patent Office 2,770,202
Patented Nov. 13, 1956

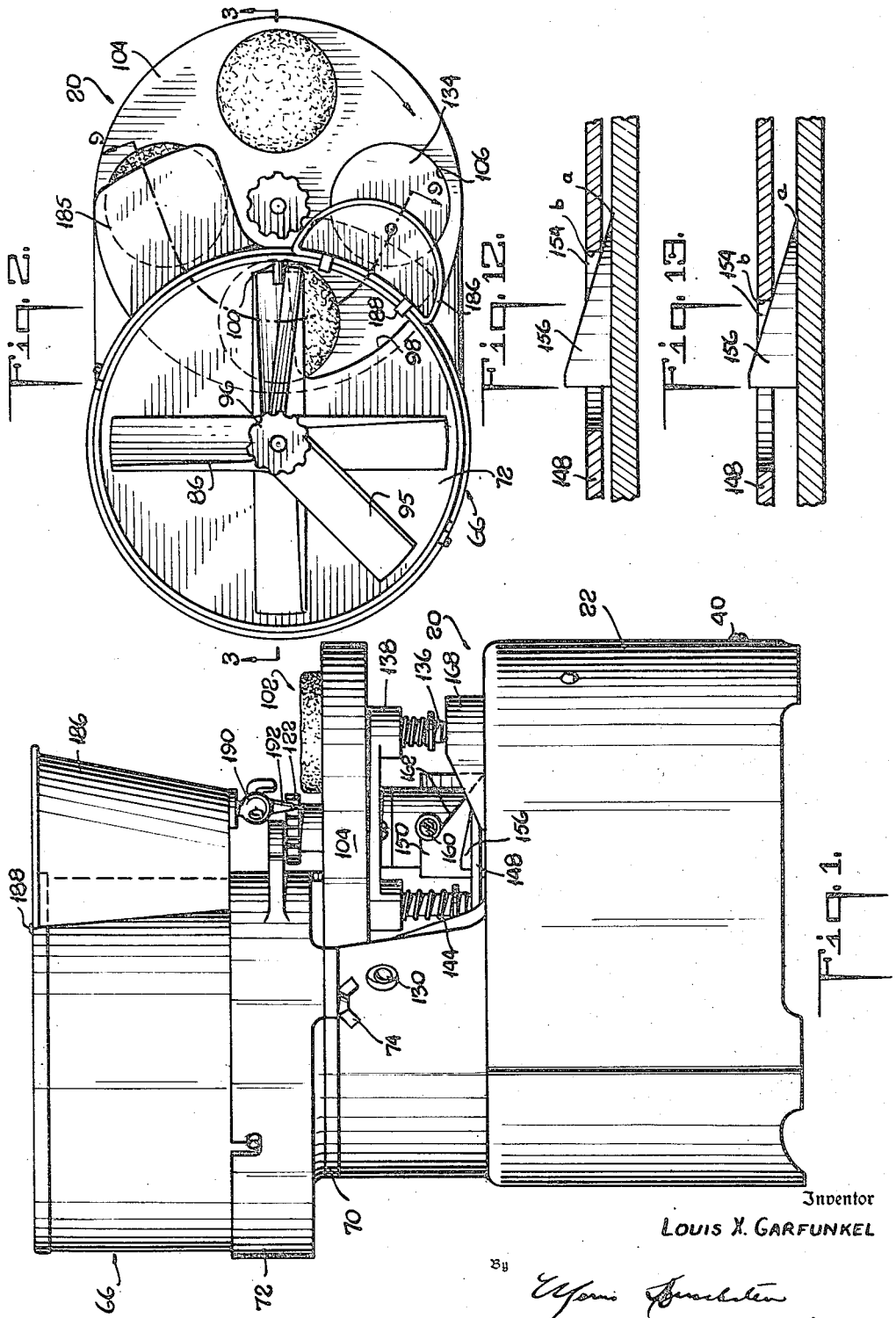

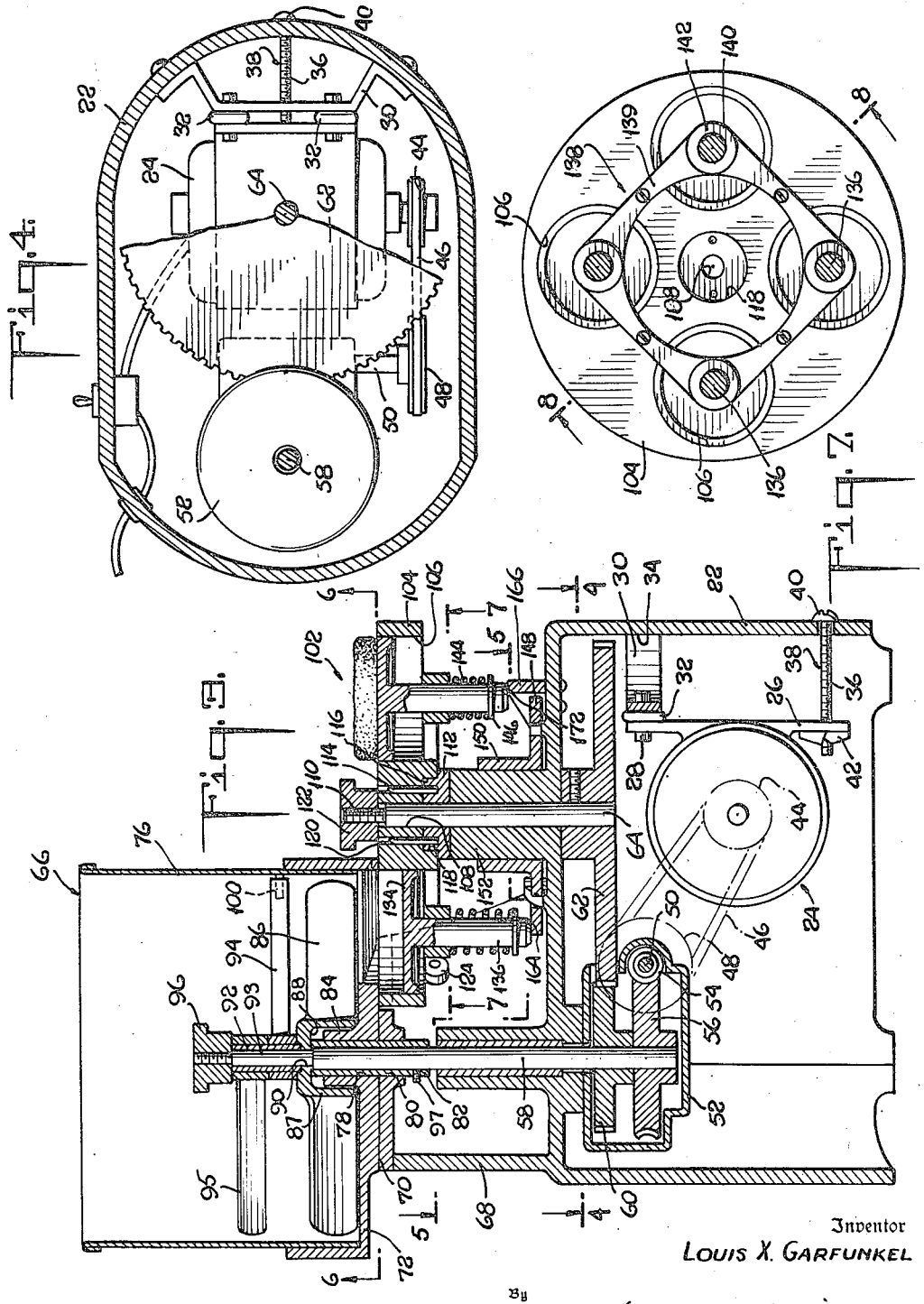

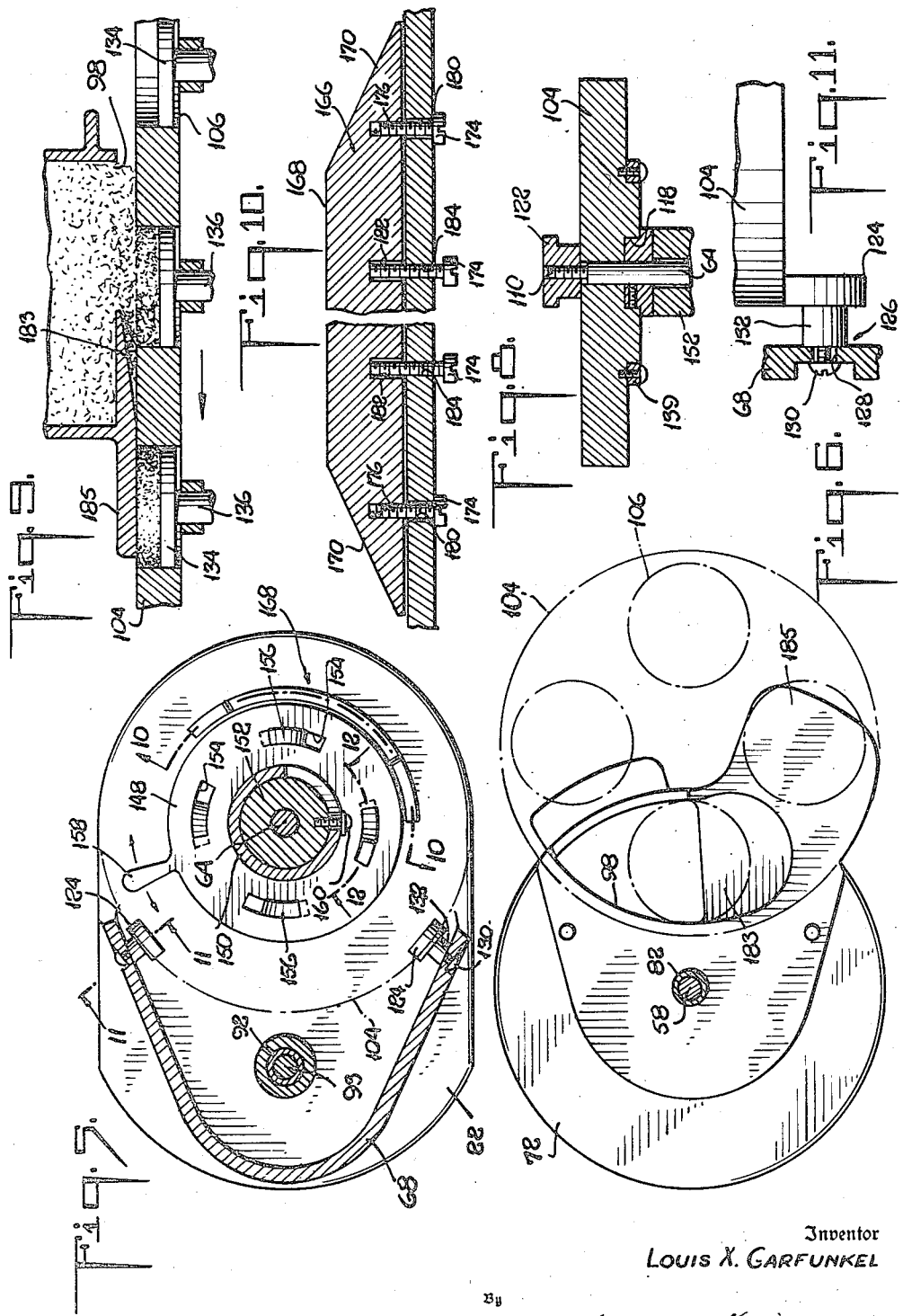

2,770,202
MACHINE FOR MOLDING PLASTIC MATERIALS

Louis X. Garfunkel, New York, N. Y.

Application November 14, 1952, Serial No. 320,450

16 Claims. (Cl. 107—15)

This invention relates to machines for molding plastic materials. More particularly, it pertains to a device for forming comminuted meat, fish or vegetable material, prepared for the making of fish cakes, potato patties, hamburgers and the like, or other plastic or easily shaped materials, into the customary cakes.

It is an object of the present invention to provide an improved machine of the character described wherein few and simple parts are employed so that it may be easily cleaned, repaired, assembled and adjusted.

It is another object of the present invention to provide a machine of the character described which is of sturdy construction and is simple and inexpensive to manufacture.

It is another object of the present invention to provide a machine of the character described in which the motor is mounted in a convenient and compact manner.

It is another object of the present invention to provide a machine of the character described wheren a particularly smooth upper surface on the food cake is ensured.

It is another object of the present invention to provide a machine of the character described in which the food when introduced into the forming mechanism under pressure does not protrude above the mold.

It is another object of the present invention to provide a machine of the character described in which the rate of introduction of food into the forming mechanism can be varied so that the machine can be adjusted for the proper speeds for materials of varying viscosity and homogeneity.

It is another object of the present invention to provide a machine of the character described which has novel cam means for varying the lower position of the ejecting pistons and novel cam means for varying the upper position of said pistons, said several cam means being operable independently of one another.

It is another object of the present invention to provide a machine of the character described in which the ejecting pistons are conveniently mounted for vertical movement.

It is another object of the present invention to provide a machine of the character described in which removal of sticky cakes is facilitated so that the machine can be used with different types of plastic materials having diverse degrees of homogeneity and stickiness.

Other objects of the present invention will in part be obvious and in part will be pointed out hereinafter.

The invention accordingly consists in the features of construction, combinations of elements and arrangements of parts which will be exemplified in the device hereinafter described and of which the scope of application will be indicated in the appended claims.

In the accompanying drawings in which is shown one of the various possible embodiments of the invention:

Fig. 1 is a side view of a machine embodying the present invention;

Fig. 2 is a top view of said machine;

Fig. 3 is a sectional view taken substantially along the line 3—3 of Fig. 2;

Figs. 4, 5, 6 and 7 are sectional views taken substantially along the lines 4—4, 5—5, 6—6 and 7—7, respectively, of Fig. 3;

Fig. 8 is a sectional view taken substantially along the line 8—8 of Fig. 7;

Fig. 9 is an enlarged fragmentary sectional view taken substantially along the line 9—9 of Fig. 2;

Figs. 10, 11 and 12 are enlarged fragmentary sectional views taken substantialy along the lines 10—10, 11—11, and 12—12, respectively, of Fig. 5; and Fig. 13 is a view similar to Fig. 12 but with the parts shown in different relative positions.

Referring now in detail to the drawings, the reference numeral 20 denotes a machine constructed in accordance with the instant invention. The machine includes a housing 22 inside of which a motor 24 is disposed. The motor is located with its base 26 in vertical position. The top end of the base is secured by nuts and bolts 28 to a holder 30, resilient pads 32 being caught under compression between the holder and the top end of the base. The holes in the base and holder through which the bolts pass are larger than the cross-section of the bolts. The resilience of the pads and the play afforded by the oversize holes provides a pivotal mounting for the motor. Said holder is secured as by screws to the front wall of the housing at 34. The bottom of the motor base has an opening freely receiving the shank 36 of a screw 38 loosely inserted into the housing with its head 40 on the outside thereof. A toggle nut 42 is threaded on the shank behind the bottom of the base.

A drive pulley 44 on the motor shaft is connected by a belt 46 to a pulley 48 mounted on a horizontal shaft 50 journalled in a gear reduction box 52 attached to the ceiling of the housing near the rear thereof. Since the center of gravity of the motor is located to the rear of the base 26 and the latter is supported near its top for rotation about a horizontal axis, the motor will tend to swing forwardly against the belt. The tension in the belt can be increased by tightening the toggle nut, for instance by turning the screw from outside the housing. The pulley must be short enough so that the center of gravity will remain to the rear of the motor base.

Inside the gear box a worm gear 54 is secured on the shaft 50. Said gear meshes with a worm wheel 56 located in the box on a vertical shaft 58 journalled in the top of the housing. Above the worm wheel 56 in the gear box and on shaft 58 is a pinion 60 meshing with a gear 62 located forwardly of the gear box on a vertical shaft 64 journalled in the housing in front of and substantially spaced from shaft 58. The motor thus drives shafts 58 and 64 which rotate in opposite directions.

Shaft 58 drives the feeding means 66 which now will be described. Said means is situated on an upstanding arcuate flange 68 projecting from the top of the housing at the rear thereof and extending forwardly over approximately one-half the length of the housing. A plate 70 is seated on and secured to the flange. A container base 72 is provided, said base resting on top of the plate and being held thereto as by downwardly projecting screws passing through holes in the plate, wing nuts 74 being employed to complete the attachment. A hopper 76 fits into the container base.

Shaft 58 projects into the hopper, passing through registered openings 78, 80 in the bottom of the container base and in the plate, respectively. The portion of shaft 58 passing through said openings is surrounded by a sleeve 82 and said sleeve projects above an upstanding boss 84 around the opening 78 in the container base 72.

A set of inclined feed propeller blades 86 extends from a hub 87 having a bottom cavity 88 adapted to fit over boss 84 with the roof of the cavity rotatably abutting the top edge of sleeve 82. The hub has an opening 90 large enough to pass shaft 58 but not sleeve 82. The hub is fixed to a hollow shaft 92 which telescopically receives shaft 58. Shaft 92 is arranged to be rotated by shaft 58 as follows: Portion 93 of shaft 58 which is received in hollow shaft 92 is provided with a flat side surface. Shaft 92 is provided with an abutment on the inner wall thereof adapted to engage said flat surface, said abutment being close enough to said surface so that the shaft 92 only can be slid vertically on the shaft 48 but not rotated with respect thereto.

Above the propellers a material stop 94 is provided, said stop being rotatable about the shaft 92. A single top propeller blade 95 is attached to shaft 92 above the material stop and rotates with said shaft; said blade is inclined similarly to blades 86 but not to so great a degree and is out of vertical alignment with the other blades for a reason to be pointed out hereinafter. The feed means is completed by a hand nut 96 screwed onto the shaft 58 which is threaded at the top thereof above portion 93.

Pursuant to the present invention the sleeve 82 is adjustable on shaft 58 by a set screw 97 passing through the wall of the sleeve. This permits the height of the propellers and stop assembly to be varied because the hub 87 rests on the sleeve, whereby varying the position of the sleeve causes different pressures to be exerted on the material in the hopper, as will be explained hereinafter.

The base of the hopper has a feed opening 98 at its front at one side thereof, and the material in the hopper is fed to the cake-forming assembly through this opening.

The hopper itself is provided with an abutment 100 projecting inwardly into the path of travel of the material stop 94.

Shaft 58 rotates shaft 92, and thus all of the propeller blades, in a direction such that the inclined faces of the feed blades force material in the hopper downwardly through opening 98. The top blade 95 serves to feed the material down and stop 94 contacts the abutment 100 and functions to block rotary movement of the material as a whole. In this way the part of the material below the stop can be forced downwardly even if highly viscous because rotary movement of the whole mass is prevented and also because the top material will pile up behind the stop and be forced downwardly into the opening 98 when the top blade passes over it. It is to cause the latter to occur that blade 95 is disposed out of vertical alignment with the feed blades. Moreover, abutment 100 should be disposed over the side of the feed opening 98 reached last by the feed blades during rotation; otherwise, material will not pile up over the opening and be forced downwardly through it.

The closer the inclined feed blades are to the container base, the greater the downward pressure they will exert on the material in the hopper. Since adjustment of sleeve 82 changes the height of the hub, such adjustment serves to control the pressure exerted by the blades on the material. This is desirable since greater or lesser pressure will be needed for feeding depending on the homogeneity and viscosity of the plastic material employed.

The cake-forming assembly 102 is operated from shaft 64 which projects above the housing. Said assembly includes a turntable 104 having a plurality of mold openings 106 in which the cakes are formed. The turntable has a central aperture 108 in which the shaft 64 is removably secured. Said shaft includes a threaded portion 110 extending above the turntable. A drive collar 112 is affixed to the shaft 64 for rotation therewith, said collar having upstanding drive pins 114. The turntable is seated on the collar, receiving the step portion 116 thereof in a recess 118 and the pins in openings 120. The pins cause the turntable to rotate with the collar and thus with the shaft. The turntable is held on the shaft 64 by a hand nut 122 threaded onto the portion 110 thereof.

When the turntable is seated on the collar, the top surface of the turntable is disposed in a plane just below the plane in which the undersurface of the container base lies. The mold openings are so located that as the turntable rotates each opening in turn passes directly beneath the feed opening of the container base.

Pursuant to a feature of the instant invention, means is provided to vary the space between the top surface of the turntable and the undersurface of the container base in order to maintain a smooth finish on the top of a cake. Said means comprises a roller 124 disposed on the inside of the flange 68 near the feed opening and in contact with the undersurface of the turntable. The axis of rotation of the roller is horizontal and radial to the shaft 64. A vertically adjustable mounting 126 is used to support the roller. Said mounting comprises a vertically elongated slot 128 in the flange and a headed screw 130 fitting through the slot and threaded into a shaft 132 on which the roller turns. By striking of the shaft, the roller can be made to lower or raise the turntable which rotatably rests on it.

An ejecting piston 134 is disposed in each mold opening to provide a bottom for the mold while a cake is being formed and to eject the same after forming. Each piston is carried by a vertical shaft 136. Pursuant to the present invention a novel mount 138 for the shafts is secured to the undersurface of the turntable. Said mount includes a frame 139 having corners 140 located below each mold opening. Each corner has a journal 142 slidably passing a shaft 136. A compression spring 144 is disposed beneath each corner with one end abutting the frame and the other end abutting a washer 146 fixed to the lower end of the associated shaft 136. Said spring biases the piston downwardly.

Novel means is provided to adjust the effective depth of the mold openings so that the thickness of the cakes to be made can be varied with ease. Said means comprises a horizontal plate 148 having a hub 150 rotatably fitting about an upstanding post 152 integral with the housing and surrounding shaft 64. Said plate has several arcuate slots 154 concentric with its center. A plurality of arcuate wedge cams 156 is provided beneath the plate on the upper surface of the housing, one cam for each slot 154. The cams are arranged to fit within the slots, each fitting simultaneously into an associated slot to the same extent as all of the others, i. e. the front ends $a$ of successive wedge cams are separated by angular distances equal to the angular distances between the front ends $b$ of successive slots.

When the plate is rotated by its handle 158, it will either ride up or down on the cams as the cams move out of or into the slots, depending on the direction of rotation and original position of the plate. Thus, the plate is raised or lowered simply by angular movement thereof.

To lock the plate in any given position, means is provided such, for example, as a set screw 160 threading into a tapped radial base in the post 152 and adapted to have its head engage the hub 150 in any adjusted position thereof. The latter is accomplished by providing an arcuate acclivity 162 in the hub for the set screw to follow, whereby as the plate is raised or lowered the hub will be within the range of the head of the set screw but will not prevent movement of the plate.

The inner portion 164 of the bottom of each shaft 136 rides on the plate 148 (see Fig. 3). Thus, as the plate is raised or lowered the height of the shaft is varied, whereby the lower position of the pistons is adjustable, the springs biasing the shafts downwardly so that when the plate is lowered they take a lower position. The shafts are raised by the plate itself when the latter is raised.

The upper, i. e. ejecting position, of the pistons is adjustably defined by an arcuate edge cam 166 having a raised dwell 168 and two downwardly sloped end portions 170. Said cam is located outside of the plate 148 at the front of the machine and the arc of the cam is parallel to the locus of the shafts. The outer portions 172 of the bottoms of said shafts ride on said cam (see Fig. 3). Thus, as each shaft reaches the front of the machine, it is raised by one end portion to a maximum height at which it remains till the other end portion of the cam is reached and then it is lowered to its original height. As this occurs the associated piston is raised to, kept at, and lowered from its uppermost position.

Pursuant to a feature of the present invention, the height of the edge cam 166 is adjustable by a means including a plurality of openings in the bottom of the cam 166, a plurality of openings in the housing aligned with the first-named openings, and bolts 174 fitting into these openings. One group 176 of openings in the cam is tapped to receive the shanks of the bolts 174; these openings are aligned with clear openings 180 in the housing which freely pass the shanks of the bolts. Another group 182 of openings in the cam freely receives the shanks of the bolts and is aligned with tapped openings 184 in the housing. The cam is raised by screwing in the bolts fitting into tapped openings 184 in the housing after having previously loosened the bolts fitting into tapped openings 176 in the cam. It is lowered by reversing the above procedure. By varying the height of the cam above the housing, the upper position of the pistons is rendered adjustable.

Because the height of the turntable can be varied whereby the relative position of the pistons and turntable is changed, and since it is desirable that when a cake is ejected the piston should not project above the turntable as this would interfere with removal of said cakes, the upper position of the pistons is made adjustable as described above.

The cakes are made as follows: the propeller blades drive material through the opening 98 in the container base into the mold openings of the turntable as said mold openings pass in turn under the container base opening. The blades rotate in a direction opposite to that in which the turntable rotates. As the mold openings pass under the container base opening, the associated pistons will be in their lowermost position as determined by the plate 148, their shafts 136 being clear of the edge cam 166 at this time. As the filled mold openings move frontwardly, the ejecting pistons rise when the shafts ride up an end of the cam 166 until they reach the dwell 168 whereupon the formed cakes are removed manually or automatically. Thereafter, ejecting pistons are lowered as the other end of cam 166 is reached so that the mold openings are ready to be refilled.

Adjacent the through opening in the container base, a channel 183 is provided (see Fig. 9); this channel slopes downwardly in the direction of rotation of the turntable. Because the plastic material is fed in under pressure, and because the mold openings are not covered for the entire feeding cycle, the plastic material tends to bulge above the turntable so that cakes of the proper thickness are not formed.

Pursuant to the instant invention, this difficulty is avoided. Adjacent the opening in the container base and on the outside of the latter, an elongated lip 185 is provided. Said lip is disposed on the edge of the opening reached last by successive mold openings and is long enough to completely cover a mold opening disposed thereunder. The width of the lip is at least equal to the diameter of the mold opening. In this way, the plastic material is prevented from bulging and is forced to spread evenly in the mold opening. The lower surface of the lip is in the same plane as the lower surface of the container base and is thus very close to the top surface of the turntable.

Some plastic materials, such, for example, as the stuffing for frankfurters, are very difficult to remove from the machine, and unless the mold is properly prepared to facilitate removal, such batters cannot be used with the machine. Pursuant to the instant invention, novel means is provided to facilitate removal of sticky batters. Said means comprises a tank 186 for a lubricating liquid such as water. The tank is conveniently suspended from the hopper by hooks 188 and has a valve 190 at the bottom controlling the discharge of liquid from a spigot 192. Said spigot is located in such a position that liquid discharged by it will fall into empty mold openings. In the embodiment illustrated, the tank is located in front of the container base opening, and the spigot is above the point where mold openings start to go under the container base. The above-described means is used as follows: the lubricating liquid, e. g. water, is placed in the tank and the valve adjusted to allow a sufficient flow of liquid into the empty mold openings as they pass by. The lubricant is spread out by the batter and in this way reaches the walls of the mold opening. Removal of finished cakes is thus made practicable even where very thick and sticky batters are used.

Thus it will be seen that there is provided a device which achieves all the objects of invention and is well-adapted to meet the conditions of practical use.

As various possible embodiments might be made of the above invention, and as various changes might be made in the embodiment above set forth, it is to be understood that all matter herein described, or shown in the accompanying drawings, is to be interpreted as illustrative and not in a limiting sense.

Having thus described this invention, there is claimed as new and desired to be secured by Letters Patent:

1. In a cake-forming machine for plastic material which machine includes a housing having a vertical member, and means for introducing plastic material to a turntable rotatable with a shaft and having mold openings in which are disposed ejecting pistons having downwardly projecting shafts equidistant from the turntable shaft, said shafts being biased downwardly by compression springs, and in which the introducing means is located on the housing to the rear of the turntable and includes a container base having an opening disposed over the turntable whereby the mold openings pass thereunder successively: means to vary the height of the turntable relative to the container base, said means comprising a roller rotatably mounted on a shaft and vertically adjustable means securing the roller to the vertical member with the roller beneath and engaging the lower surface of the turntable, and variable means for defining the upper position of said pistons, said means being disposed on the side of the turntable shaft remote from the introducing means, said means comprising an edge cam concentric about the turntable shaft and having a central dwell and two downwardly sloped end portions, said edge cam being located in such position that the outer portions of the bottoms of the piston shafts must pass thereover, whereby when successive mold openings pass the edge cam after having been filled on passing beneath the introducing means, the associated shafts are respectively pushed upwardly against the bias of the compression springs so that the ejecting pistons successively move finished cakes out of successive mold openings, said variable means including a set of tapped openings in the bottom of the edge cam aligned with a set of associated untapped openings in the housing, a series of untapped openings in the bottom of the edge cam aligned with a series of tapped openings in the housing, and bolts disposed in the aligned openings, whereby selectively varying the distance which said bolts are screwed into their respective tapped openings will vary the height of the edge cam above the housing, so that the upper position of the piston can be varied.

2. In a machine including a housing having a vertical member, and means for feeding plastic material through an aperture in a container base to a rotatable turntable having a plurality of mold openings passing successively beneath said aperture: means to vary the height of the turntable relative to the container base, said means comprising a roller rotatably mounted on a shaft and vertically adjustable means securing the roller to the vertical member with the roller beneath and engaging the lower surface of the turntable, and a lip elongated in the direction of rotation of the turntable, said lip being disposed on the container base at the side of the aperture reached last by the rotating mold openings, the undersurface of the lip being substantially in the same plane as the undersurface of the container base, whereby bulging of the plastic material in the mold openings is prevented.

3. In a cake-forming machine for plastic material which machine includes cake-forming means comprising a turntable having mold openings in which are disposed ejecting pistons reciprocable between an upper and lower position in a mold opening, said pistons having downwardly projecting shafts, the turntable being operable from a shaft rotatable in a housing, and the piston shafts being disposed equidistant from the turntable shaft: means to mount said pistons for vertical reciprocation, said means comprising a member separate from, disposed beneath and secured to the turntable, said member having vertical bores therein, each bore being disposed beneath and slidably receiving the shaft projecting beneath a piston, stop means on the lower end of each shaft, a compression spring disposed on each shaft between the stop means and the mounting member, whereby the pistons are biased towards their lowermost position, means for varying the lower position of the ejecting pistons, means for varying the upper position of said pistons, said several means being variable independently of one another; said means for varying the lower position comprising a plate having a hole therein which receives a sleeve disposed on the housing around the turntable shaft, the diameter of the plate being such that the inner portions of the bottoms of the piston shafts are in line with said plate, whereby said inner portions can ride on said plate, and means to adjust the height of said plate; the means for varying the upper position of said pistons comprising an edge cam disposed a distance from the turntable shaft such that the outer portions of the bottoms of the piston shafts can rest on said cam, and means to adjust the height of said cam above the housing.

4. In a machine including a housing having a vertical member, means for feeding plastic material through a container base below said feed means into cake-forming means including a rotatable turntable, said feed means being slidably on and rotatable by a shaft: means to vary the height of the turntable relative to the container base, said last-named means comprising a roller rotatably mounted on a shaft and vertically adjustable means securing the roller to the vertical member with the roller beneath and engaging the lower surface of the turntable, and means to vary the height of the feed means above the opening, said means constituting a sleeve adjustably secured on the shaft beneath the feed means which rests thereon, whereby adjustment of the position of the sleeve on the shaft will serve to vary the height of the feed means above the opening.

5. In a cake-forming machine for plastic material which machine includes cake-forming means comprising a turntable having mold openings in which are disposed ejecting pistons having downwardly projecting shafts: means for successively varying the lower position of the ejecting pistons and means for successively varying the upper position of said pistons, said last-named two means being variable independently of one another, the means for varying the lower position comprising a vertically adjustable member on which the inner portion relative to the turntable axis of the bottom of each shaft intermittently rides, and the means for varying the upper position comprising a vertically adjustable member on which the outer portion relative to the turntable axis of the bottom of each shaft intermittently rides.

6. In a cake-forming machine for plastic material which machine includes cake-forming means comprising a turntable having mold openings in which are disposed ejecting pistons having downwardly projecting shafts, the turntable being operable from a shaft rotatable in a housing and the piston shafts being disposed equidistant from the turntable shaft: means for varying the lower position of the ejecting pistons, and means for varying the upper position of said pistons, said several means being variable independently of one another, said means for varying the lower position comprising a plate having a hole therein which receives a sleeve disposed on the housing around the turntable shaft, the diameter of the plate being such that the inner portions of the bottoms of the piston shafts are in line with said plate, whereby said inner portions can ride on said plate, and means to adjust the height of said plate; the means for varying the upper position of said pistons comprising an edge cam disposed a distance from the turntable shaft such that the outer portions of the bottoms of the piston shafts can rest on said cam, and means to adjust the height of said cam above the housing.

7. In a cake-forming machine for plastic material, the combination of a hopper having a bottom wall with a feed opening therein, a vertical drive shaft extending through said bottom wall, a feed means in said hopper, said feed means constituting a multi-bladed member immediately above the feed opening, said member having a downwardly facing well therein, said member being slidable on and rotatable with the drive shaft, said well having a diameter in excess of the diameter of said drive shaft, whereby a space is provided between the well and the shaft, and means to vary the height of the feed means above the feed opening, said means constituting a sleeve adjustably secured directly on the shaft beneath the feed means, the top of the sleeve extending into the well and the bottom of the well resting on said sleeve, whereby adjustment of the position of the sleeve on the shaft will vary the height of the feed means above the opening.

8. A device as set forth in claim 7 wherein the means for adjustably securing the sleeve on the shaft constitutes a set screw fitting into an opening in the sleeve communicating with the inside thereof, the tip of the screw being adapted to engage the shaft.

9. In a machine including a housing having a vertical member, means for feeding plastic material to a rotatable turntable having cake-forming means and wherein the feed means includes a container base through which the plastic material passes: means to vary the height of the turntable relative to the container base, said last-named means comprising a roller rotatably mounted on a shaft and vertically adjustable means securing the roller to the vertical member with the roller beneath and engaging the lower surface of the turntable.

10. A device as set forth in claim 9 wherein the vertically adjustable means securing the roller to the vertical member includes a slot in the vertical member and an element fitting into said slot, the cross-section of the element being less than the height of the slot.

11. A device as set forth in claim 9, wherein the axis of rotation of the roller is horizontally and radial to the axis of rotation of the turntable.

12. In a machine including means for feeding plastic material through an aperture in a container base to a rotatable turntable having a plurality of mold openings passing successively beneath said aperture: a lip, said lip being disposed on the container base at the side of the aperture reached last by the rotating mold openings, the undersurface of the lip being in the same plane as the undersurface of the container base and being elongated in the direction of rotation of the turntable.

13. A device as set forth in claim 12 wherein the length and width of the elongated lip is at least equal to the diameter of the mold openings.

14. In a cake-forming machine for plastic material which machine includes cake-forming means comprising a turntable having mold openings in which are disposed ejecting pistons having downwardly projecting shafts, the turntable being operable from a shaft rotatable in a housing and the piston shafts being disposed equidistant from the turntable shaft: means for varying the lower position of the ejecting pistons, said last-named means comprising a plate, a circular series of identically sloped wedge cams disposed beneath said plate and on the housing, the plate having a hole therein, a sleeve on the housing around the shaft, said sleeve being received in the hole, the plate having a series of arcuate slots disposed concentrically therein, the front ends of successive wedge cams being separated from each other the same distance as the front ends of successive slots, the wedge cams being disposed the same distance from the shaft as the slots whereby said cams are received in the slots, the plate being of such diameter that its periphery is located beneath the inner portions of the bottoms of the piston shafts, which inner portions, therefore, can ride upon the plate, the position of the plate being adjusted by rotation thereof on the wedge cams, whereby the lower position of the ejecting pistons is defined by said plate and said position is adjustable between an extreme upper position of the plate defined by the top of the cams and an extreme lower position of the plate defined by the housing, and means to lock the plate in any selected position.

15. In a cake-forming machine for plastic material which machine includes cake-forming means comprising a turntable having mold openings in which are disposed ejecting pistons having downwardly projecting shafts, said shafts being biased downwardly by compression springs, the turntable being operable from a shaft rotatable in a housing, and the piston shafts being disposed equidistant from the turntable shaft, and wherein means is provided for introducing plastic food material into the cake-forming means, said introducing means being located on the housing to the rear of the cake-forming means, said introducing means having an opening disposed over the turntable whereby the mold openings pass thereunder successively: variable means for defining the upper position of said pistons, said means being disposed on the side of the turntable shaft remote from the introducing means, said means comprising an edge cam concentric about the turntable shaft and having a central dwell and two downwardly sloped end portions, said edge cam being located in such position that the outer portions of the bottoms of the piston shafts must pass thereover, whereby when successive mold openings pass the edge cam after having been filled on pasing beneath the introducing means, the associated shafts are respectively pushed upwardly against the bias of the compression springs so that the ejecting pistons successively move finished cakes out of successive mold openings, said variable means including a set of tapped openings in the bottom of the edge cam aligned with a set of associated untapped openings in the housing, a series of untapped openings in the bottom of the edge cam aligned with a series of tapped openings in the housing, and bolts disposed in the aligned openings, whereby selectively varying the distance which said bolts are screwed into their respective tapped openings will vary the height of the edge cam above the housing so that the upper position of the piston can be varied.

16. In a cake-forming machine including a turntable operable from a shaft driven by a motor, means for removably securing to and rendering the turntable rotatable with the shaft, said means including an aperture in the turntable receiving said shaft, and a drive collar fixed on the shaft for rotation therewith and having upstanding drive pins, the turntable being seated on the collar and having openings receiving the pins.

References Cited in the file of this patent
UNITED STATES PATENTS

| | | |
|---|---|---|
| 418,841 | Hoffman | Jan. 7, 1890 |
| 1,327,806 | Bunde | Jan. 13, 1920 |
| 1,669,526 | Lauhoff | May 15, 1928 |
| 1,836,006 | Bighton et al. | Dec. 15, 1931 |
| 1,836,007 | Bighton et al. | Dec. 15, 1931 |
| 1,911,016 | Garfunkel | May 23, 1933 |
| 1,911,017 | Garfunkel | May 23, 1933 |
| 1,935,877 | Hamerstadt | Nov. 21, 1933 |
| 2,066,560 | Evans | Jan. 5, 1937 |
| 2,211,638 | Benz | Aug. 13, 1940 |
| 2,255,908 | Anderson | Sept. 16, 1941 |
| 2,367,267 | Dawson | Jan. 16, 1945 |
| 2,444,282 | Creevy | June 29, 1948 |
| 2,456,088 | Scircle | Dec. 14, 1948 |
| 2,475,463 | Santo | July 5, 1949 |
| 2,530,016 | Holly | Nov. 14, 1950 |